(12) United States Patent
Dasgupta et al.

(10) Patent No.: US 11,369,967 B2
(45) Date of Patent: Jun. 28, 2022

(54) DEVICES AND METHODS FOR DETECTING ANALYTES

(71) Applicant: Board of Regents, The University of Texas System, Austin, TX (US)

(72) Inventors: Purnendu Dasgupta, Arlington, TX (US); Aditya Das, Arlington, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 218 days.

(21) Appl. No.: 16/855,782

(22) Filed: Apr. 22, 2020

(65) Prior Publication Data

US 2020/0338558 A1 Oct. 29, 2020

Related U.S. Application Data

(60) Provisional application No. 62/837,307, filed on Apr. 23, 2019.

(51) Int. Cl.
| | |
|---|---|
| *B01L 3/00* | (2006.01) |
| *B01F 29/10* | (2022.01) |
| *G01N 21/31* | (2006.01) |
| *G01N 35/10* | (2006.01) |
| *B01F 29/321* | (2022.01) |

(52) U.S. Cl.
CPC .............. *B01L 3/52* (2013.01); *B01F 29/10* (2022.01); *B01F 29/321* (2022.01); *G01N 21/31* (2013.01); *G01N 35/1002* (2013.01); *B01L 2200/025* (2013.01); *B01L 2300/0858* (2013.01)

(58) Field of Classification Search
CPC ........ B01L 3/52; B01L 3/50; B01L 2200/025; B01L 2300/0858; B01F 29/10; B01F 29/321; B01F 29/00; B01F 29/32; B01F 29/30; G01N 21/31; G01N 21/25; G01N 21/17; G01N 35/1002; G01N 35/10
USPC ................................................... 422/547, 500
See application file for complete search history.

(56) References Cited

U.S. PATENT DOCUMENTS

2016/0106946 A1* 4/2016 Gellman ................. C01B 21/24
422/119

OTHER PUBLICATIONS

Macka, Light-Emitting Diodes for Analytical Chemistry, Annu. Rev. Anal. Chem. 2014. 7:183-207. (Year: 2014).*

* cited by examiner

*Primary Examiner* — Christine T Mui
(74) *Attorney, Agent, or Firm* — Nexsen Pruet, PLLC

(57) ABSTRACT

A cartridge comprises a housing; a sample mixing compartment disposed within the housing, the sample mixing compartment comprising: an activation pouch, and a sample collection region; and a gas transporter tube having a first end and a second end, the tube being disposed within the housing adjacent to the sample mixing compartment, wherein the sample mixing compartment is partially defined by a moveable door of the housing, the moveable door providing access to the sample mixing compartment when the door is in an open position and preventing access to the sample mixing compartment when the door is in a closed position; and wherein the door is configured to release contents of the activation pouch upon movement from the open position to the closed position.

32 Claims, 9 Drawing Sheets

DEVICES AND METHODS FOR DETECTING ANALYTES

CROSS-REFERENCE TO RELATED APPLICATIONS

This application claims priority under 35 U.S.C. § 119(e) to U.S. Provisional Patent Application No. 62/837,307, filed Apr. 23, 2019, the entirety of which is incorporated by reference herein.

STATEMENT REGARDING FEDERALLY SPONSORED RESEARCH

This invention was made with government support under grant No. NINDS U01 NS058030-S3 awarded by the National Institutes of Health. The government has certain rights in the invention.

FIELD

This invention relates to device and methods for detecting analytes, and in particular, analytes comprising cyanide.

BACKGROUND

Cyanide is a fast-acting chemical poison generated by residential and industrial fires, and is a major cause of injury and death from smoke inhalation. Accurate and rapid assessment of victims to determine if they need treatment for cyanide poisoning is important, because treatment of cyanide poisoning is expensive and carries significant risks.

Therefore, there exists a need for improved devices and methods for acutely and effectively detecting cyanide poisoning.

SUMMARY

A novel field-deployable device is described herein that can quickly and easily measure analyte concentrations. In some cases, devices described herein can guide or assist in acute diagnosis and treatment of patients, such as victims of poison exposure. In one aspect, a method for detecting an analyte and a device comprising a cartridge for detecting an analyte are described herein, which, in some cases, can provide one or more advantages compared to other methods and devices. For example, in some embodiments, a device described herein is highly portable and user-friendly. The device can be handheld and can comprise a disposable cartridge or a reusable cartridge for repeated use of the device.

In one aspect, a cartridge is described herein which, in some embodiments, comprises a housing, a sample mixing compartment disposed within the housing, and a gas transporter tube having a first end and a second end. The gas transporter tube can be disposed within the housing adjacent to the sample mixing compartment. In some embodiments, the sample mixing compartment is partially defined by a moveable door of the housing. The moveable door can provide access to the sample mixing compartment when the door is in an open position and can prevent access to the sample mixing compartment when the door is in a closed position. In some embodiments, the sample mixing compartment comprises an activation pouch and a sample collection region. The door of the housing can be configured to release contents of the activation pouch onto the sample collection region when the door is moved from the open position to the closed position.

In some embodiments, a cartridge described herein further comprises one or more additional components, such as a first optical window proximate the first end of the tube and a second optical window proximate the second end of the tube. A cartridge can further comprise a first end cap positioned at the first end of the tube and a second end cap positioned at the second end of the tube, wherein the first end cap seals the first end of the tube and the second end cap seals the second end of the tube. Additionally, a cartridge can further comprise a puncturing tool configured to release contents of the activation pouch when the door is moved from the open position to the closed position. The puncturing tool, in some cases, is attached to or positioned on the door or the housing.

In some embodiments, a liquid is disposed within the gas transporter tube. The liquid, in some cases, can have a first absorbance at a wavelength $\lambda_1$ in an absence of an analyte and a second absorbance at the wavelength $\lambda_2$ in the presence of the analyte. In some instances, wavelength $\lambda_1$ is the same as wavelength $\lambda_2$ such that the liquid has a first absorbance at a wavelength $\lambda$ in an absence of an analyte and a second absorbance at that wavelength $\lambda$ in a presence of the analyte.

In some cases, the first absorbance corresponds to an indicator species, such as a cobinamide, in an unbound or unreacted state and the second absorbance corresponds to the indicator species in a bound or reacted state. In some cases, the indicator species in the bound or reacted state is bound to or reacted with the analyte.

A device for detecting an analyte in a sample is also described herein. In some cases, the sample is a bodily fluid sample, such as blood or saliva, an environmental sample, such as soil or water, or a food sample. In some embodiments, a device described herein comprises a cartridge, as described above, a light source, and an optical detector. The light source, in some cases, is positioned at a first end of the gas transporter tube of the cartridge, and the optical detector, in some cases, is positioned at a second end of the gas transporter tube of the cartridge. The light source, in some cases, is an LED, which can emit light at a wavelength between 250 and 1000 nm. In some embodiments, a device further comprises a processor and a power source.

In another aspect, a method of detecting an analyte in a sample is described herein, which in some cases, utilizes a cartridge and/or device described herein. For example, such a method can comprise providing a cartridge, disposing the sample in the cartridge, measuring a series of absorbance values, and determining a concentration of the analyte from the absorbance measurements. In some embodiments, a method further comprises determining that the analyte is absent from the sample or present in the sample below a detectable level. A method described herein, in some cases, can further comprise one or more steps of closing the door of the cartridge, locking the door, sealing the housing, puncturing the activation pouch, releasing contents of the activation pouch onto the sample collection region, and mixing the contents of the activation pouch with the sample. In some embodiments, a method described herein can further comprise measuring absorbance values in specific time intervals, such as 5 second to 30 second time intervals, or for a desired period of time, such as for 100 second to 300 seconds of time.

These and other embodiments are described in more detail in the detailed description which follows.

DETAILED DESCRIPTION

Figure 1:
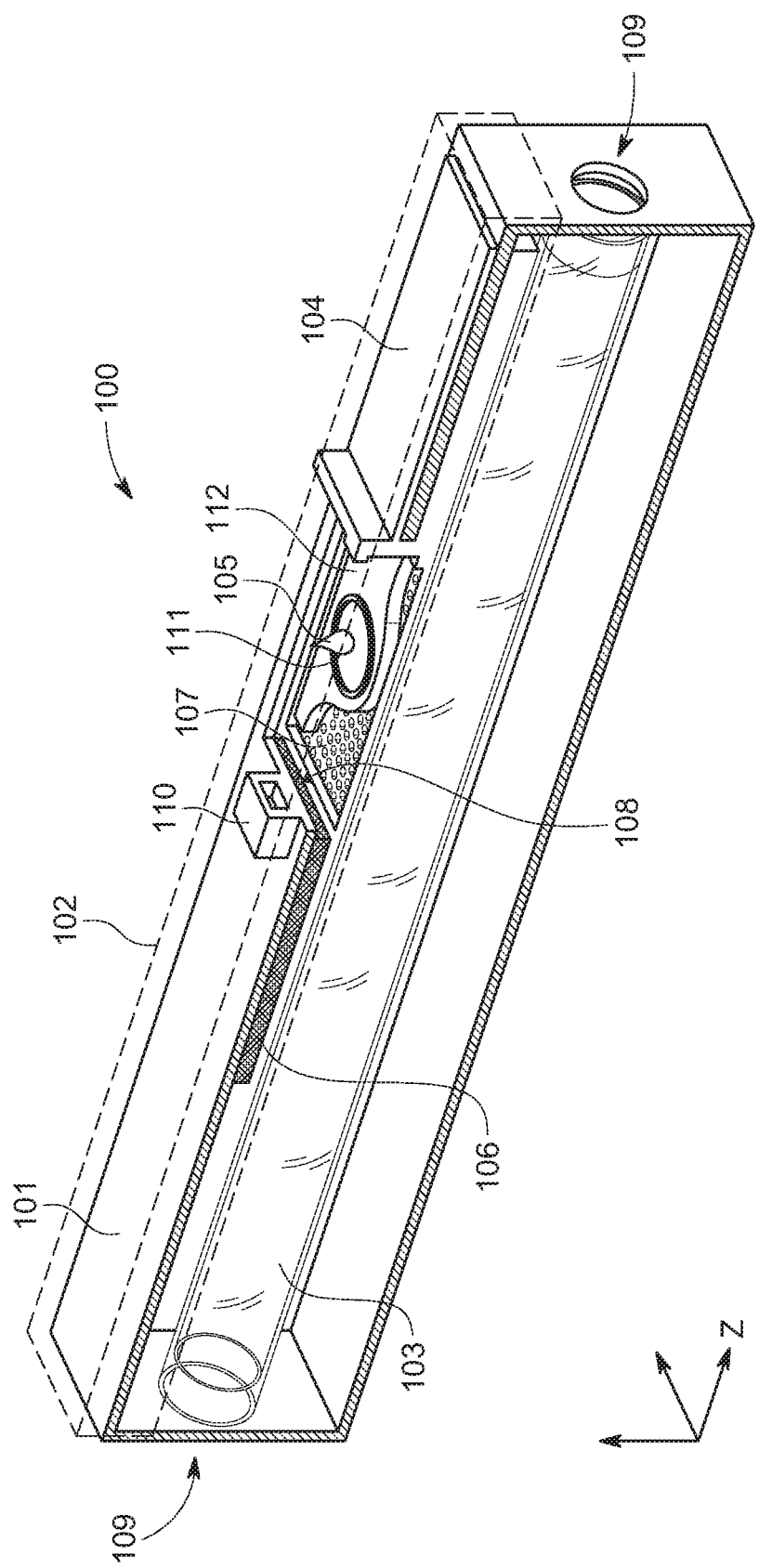
FIG. 1 is a perspective view of a cartridge according to one embodiment described herein.

Embodiments described herein can be understood more readily by reference to the following detailed description, examples, and figures. Elements, apparatus, and methods described herein, however, are not limited to the specific embodiments presented in the detailed description, examples, and figures. It should be recognized that these embodiments are merely illustrative of the principles of this disclosure. Numerous modifications and adaptations will be readily apparent to those of skill in the art without departing from the spirit and scope of this disclosure.

In addition, all ranges disclosed herein are to be understood to encompass any and all subranges subsumed therein. For example, a stated range of "1.0 to 10.0" should be considered to include any and all subranges beginning with a minimum value of 1.0 or more and ending with a maximum value of 10.0 or less, e.g., 1.0 to 5.3, or 4.7 to 10.0, or 3.6 to 7.9.

All ranges disclosed herein are also to be considered to include the end points of the range, unless expressly stated otherwise. For example, a range of "between 5 and 10" or "from 5 to 10" or "5-10" should generally be considered to include the end points 5 and 10.

Further, when the phrase "up to" is used in connection with an amount or quantity, it is to be understood that the amount is at least a detectable amount or quantity. For example, a material present in an amount "up to" a specified amount can be present from a detectable amount and up to and including the specified amount.

I. A Cartridge for Detecting an Analyte

Referring to FIG. 1-FIG. 6, a cartridge 100 is described herein. In some embodiments, a cartridge 100 described herein comprises a housing 101, a sample mixing compartment 102 disposed within the housing 101, and a gas transporter tube 103. In some embodiments, the sample mixing compartment 102 comprises or is partially defined by the housing 101 and/or a moveable door 104 of the housing. The moveable door 104 can provide user access to the sample mixing compartment 102 when the door 104 is in an open position and can prevent access to the sample mixing compartment 102 when the door 104 is in a closed position.

The housing 101 can be a polyhedral shaped housing in some instances, such as a square box, rectangular box, or a cylindrical shape, having hinges and an opening that allow access to the interior of the housing. However, the housing 101 is not limited to polyhedral shapes, but, rather, any shaped housing not inconsistent with the goals of the disclosure can be used. In some cases, the housing 101 is a uniform enclosure having one or more walls to encapsulate the sample mixing compartment 102 and the gas transporter tube 103. The housing 101, in some instances, can be one seamless part, such as a molded plastic, or in some cases, the housing 101 can comprise multiple parts that are sealed together. In some embodiments, the housing 101 is gas impermeable. For example, the housing 101 and/or moveable door 104 can comprise one or more gas impermeable seals, as needed, to prevent any gas leaks from any seams of the housing 101 and/or the sample mixing compartment 102 when the door 104 is in a closed position.

In some embodiments, the sample mixing compartment 102 comprises an activation pouch 106 and a sample collection region 114. In some cases, the sample mixing compartment 102 can comprise or be partially defined by one or more other components of the cartridge 100, such as a sample collection region 114, a housing 101, a moveable door 104, an activation pouch 106, a perforated tray 107, a puncturing tool 108, a locking mechanism 110, and/or an absorbent pad 112. The sample mixing compartment 102, in some instances, can be in fluid communication with an exterior of the cartridge 100 when the door 104 of the cartridge is in an open position. Additionally, the sample mixing compartment 102, in some instances, can be in fluid communication with the interior of the cartridge 100 when the door 104 of the cartridge is in a closed position. For reference purposes, door 104 is shown in an open position in FIG. 1 and FIG. 6, where the door 104 is positioned proximate to a first end of cartridge 100. In a closed position, door 104 is displaced along the z-axis towards a central region of cartridge 100, as illustrated by the arrow in FIG. 6. In a closed position, door 104 covers at least the activation pouch 106, perforated tray 107, and puncturing tool 108. When the door 104 is in a closed position, gas formed within the cartridge upon mixing contents of an activation pouch 106 with a sample 105 can freely move, dissipate, disperse, or diffuse from the sample mixing compartment 102 to other areas, regions, or components in the interior of the cartridge 100, such as around and/or inside the gas transporter tube 103.

In some embodiments, the moveable door 104 can partially define the sample mixing compartment 102 and/or the sample collection region 114. For example, the moveable door 104, in some cases, can be a sliding door that moves on a track connected to or on the housing 101. In some cases, the moveable door 104 can be an articulating door that swings from hinges connecting or attaching the door to the housing 101. In some embodiments, the moveable door 104 can provide user access to the sample collection region 114 when the door is in an open position, such that a user can dispose a sample 105 onto the absorbent pad 112. In some cases, the moveable door 104 can provide an air-tight seal to the housing 101 when the door is in a closed position. In some embodiments, the movable door, when in a closed position, is locked.

In some embodiments, a cartridge described herein comprises a locking mechanism 110. The locking mechanism 110, in some instances, can be attached to, position on, or incorporated into the moveable door 104 and/or the housing 101. In some cases, the locking mechanism 110 can be a mechanical switch, a mechanical lever, or a stretchable band. In an embodiment shown in FIG. 1, the locking mechanism 110 is positioned on the housing 101.

A gas transporter tube 103, in some embodiments, is disposed within the housing of the cartridge. The gas transporter tube 103 can be positioned adjacent to the sample mixing compartment 102 such that a length of the tube extending along a z-axis is juxtaposed adjacent to a length of the sample mixing compartment 102 extending along the same z-axis. For example, in some cases, a first end of the gas transporter tube 103 can be adjacent or proximate a first end of the cartridge 100, and a second end of the gas transporter tube 100 can be positioned adjacent or proximate a second end the cartridge 100. For reference purposes only, a first end of cartridge 100 in FIG. 1 is an end having the door 104, and a second end of cartridge 100 in FIG. 1 is an end opposite door 104. In some cases, a gas transporter tube 103 of the cartridge 100 is liquid impermeable and gas permeable. For example, in some cases, gas can freely enter or exit the gas transporter tube 103 whereas liquid, in some cases, cannot freely enter or exit the tube 103. In some embodiments, the gas transporter tube 103 is formed from a hydrophobic material or comprises a hydrophobic coating. For example, in some cases, the gas transporter tube 103 can be formed from a thermoplastic polymer. The thermoplastic polymer can be a microporous polymer in some instances. In some embodiments, the thermoplastic polymer is a microporous polyolefin. Exemplary polyolefins include polyethylene, polypropylene, and the like. Other hydrophobic materials or coatings comprising a hydrophobic thermoplastic polymer can also be used, such as a porous perfluoroalkoxy polymer resin such as polytetrafluoroethene (PTFE) or Teflon®, a porous poly(vinylidene)fluoride, and the like.

In some embodiments, a liquid is disposed within the gas transporter tube 103. In some cases, the liquid has a first absorbance at a wavelength $\lambda_1$ in an absence of an analyte. In some cases, the liquid has a second absorbance at the wavelength $\lambda_2$ in a presence of the analyte. The wavelength $\lambda$ can be a wavelength between about 400 nm and 700 nm or between about 550 nm and 600 nm. For example, in some cases, the wavelength $\lambda$ can be about 580 nm. In some cases, wavelength $\lambda_1$ and wavelength $\lambda_2$ are the same wavelength, such that the liquid has a first absorbance at a wavelength $\lambda$ in an absence of an analyte and a second absorbance at that wavelength $\lambda$ in a presence of the analyte. In some embodiments, multiple analytes can be detected by observing changes in absorbance of multiple different wavelengths, where each analyte changes absorbance of a different wavelength.

In some embodiments, the first absorbance of the liquid corresponds to an absorbance of an indicator species present in the liquid in an unbound or unreacted state. In some embodiments, the second absorbance of the liquid corresponds to the indicator species of the liquid in a bound or reacted state. For example, in some cases, the indicator species in the bound or reacted state can be bound to or can react with an analyte. In some cases, the analyte can comprise cyanide ($CN^-$), hydrogen cyanide (HCN), carbon dioxide ($CO_2$), carbon monoxide (CO), ammonia ($NH_3$), ammonium ($NH_4^+$), arsine ($AsH_3$), and/or other analytes.

In some embodiments, the indicator species can comprise any chemical or molecular species capable of undergoing a change or a shift in absorption at wavelength $\lambda$ when going from an unbound or unreacted state to a bound or reacted state. In some cases, the change in absorption can occur upon a change in conformation of the chemical or molecular species, for example, due to a change in temperature, pressure, or other physical property change. In some cases, the change in absorption can occur upon a chemical reaction involving the chemical or molecular species. For example, in some embodiments, the chemical reaction can involve the indicator species and the analyte. That is, in some embodiments, the change in absorption can occur upon a chemical reaction between the indicator species and the analyte. In some cases, the indicator species can comprise a cobinamide. For example, in some instances, a liquid disposed within the gas transporter tube 103 comprises a cobinamide solution. Additionally, in some embodiments, the cobinamide can comprise aquocyanocobinamide.

In some embodiments, an activation pouch 106 can be a pouch, bag, sack, container, ampule, reservoir, or other similar vessel for holding and/or isolating activation contents of the cartridge 100. The activation pouch 106, in some embodiments, can comprise or be formed from a material that is penetrable by a puncturing tool 108 of the cartridge, as described further below, or any other tool capable of puncturing, opening, or rupturing the activation pouch 106 to release contents of the activation pouch. For example, the activation pouch 106 can be formed from a liquid-sealed plastic bag. In some embodiments, the activation pouch 106 can be a container having a leak-resistant or leak-proof seal or lid, such as an aluminum, plastic, or rubber seal or lid. In some instances, the activation pouch 106 is a single-use pouch that can be replaced after releasing contents of the activation pouch 106. That is, the activation pouch 106, following a release of its contents within the sample mixing compartment 102, can be wholly removed from the cartridge 100 and replaced with a new or un-used activation pouch 106. In other instances, the activation pouch 106 can be refillable and/or re-sealable, such that following the release of its contents within the sample mixing compartment 102, the activation pouch 106 can be refilled or re-sealed.

In some embodiments, the activation content of an activation pouch 106 is specific to the analyte of the sample. For example, an activation pouch comprising certain activation content can be used to detect a certain analyte. The activation content, in some cases, can be a liquid, solid, or gaseous material. For example, the activation content can be a solution, i.e. an activation solution. In some instances, the activation content can be an acidic or basic solution. Some non-limiting examples of activation solution or activation contents include sulfuric acid, citric acid, sulfonic acid, and phosphoric acid. In some embodiments, for example, when the analyte comprises cyanide, such as in a matrix of blood, the activation solution can preferably be phosphoric acid ($H_3PO_4$). In some instances, the activation contents can be provided in a specific form, including a specific formulation, for a certain type of sample. Any activation contents capable of reacting with an analyte in a sample 105 to form a gas comprising the analyte can be used. A list of non-limiting examples of activation contents suitable for detecting certain analytes is provide in Table I below. It should be understood that any activation contents not inconsistent with the goals of the disclosure are contemplated.

TABLE I

| Exemplary Activators and Analytes | |
|---|---|
| Activation Content | Analyte |
| Phosphoric acid; Sulfuric acid; Sulfamic acid; Citric acid; Oxalic acid | Cyanide |
| Any mineral acid: Hydrochloric, Sulfuric or Nitric acid | Carbon dioxide |

TABLE I-continued

Exemplary Activators and Analytes

| Activation Content | Analyte |
| --- | --- |
| Sodium hydroxide, Potassium hydroxide | Ammonia from ammonium salts |
| Urease | Ammonia from urea |
| Sodium borohydride | Arsine from dissolved arsenic |

In some embodiments, a cartridge 100 described herein can further comprise a puncturing tool 108 disposed in the sample mixing compartment 102. The puncturing tool 108, in some cases, is configured to puncture the activation pouch 106 when the door 104 is moved from an open to a closed position. In some embodiments, the puncturing tool 108 can comprise a blade, a needle, or other similar sharply edged or sharply pointed object. In some instances, the puncturing tool 108, can be formed from a metal or a plastic. In some embodiments, the puncturing tool 108 can be a sharply pointed extension protruding from another component of the cartridge 100 or sample mixing compartment 102, such as from the door 104, the perforated tray 107, or the housing 101. In some embodiments, the puncturing tool 108 can be a blade, a needle, a lance, or other similar sharp object attached to or positioned on another component of the cartridge 100, such as door 104, perforated tray 107, or housing 101.

Figure 4:
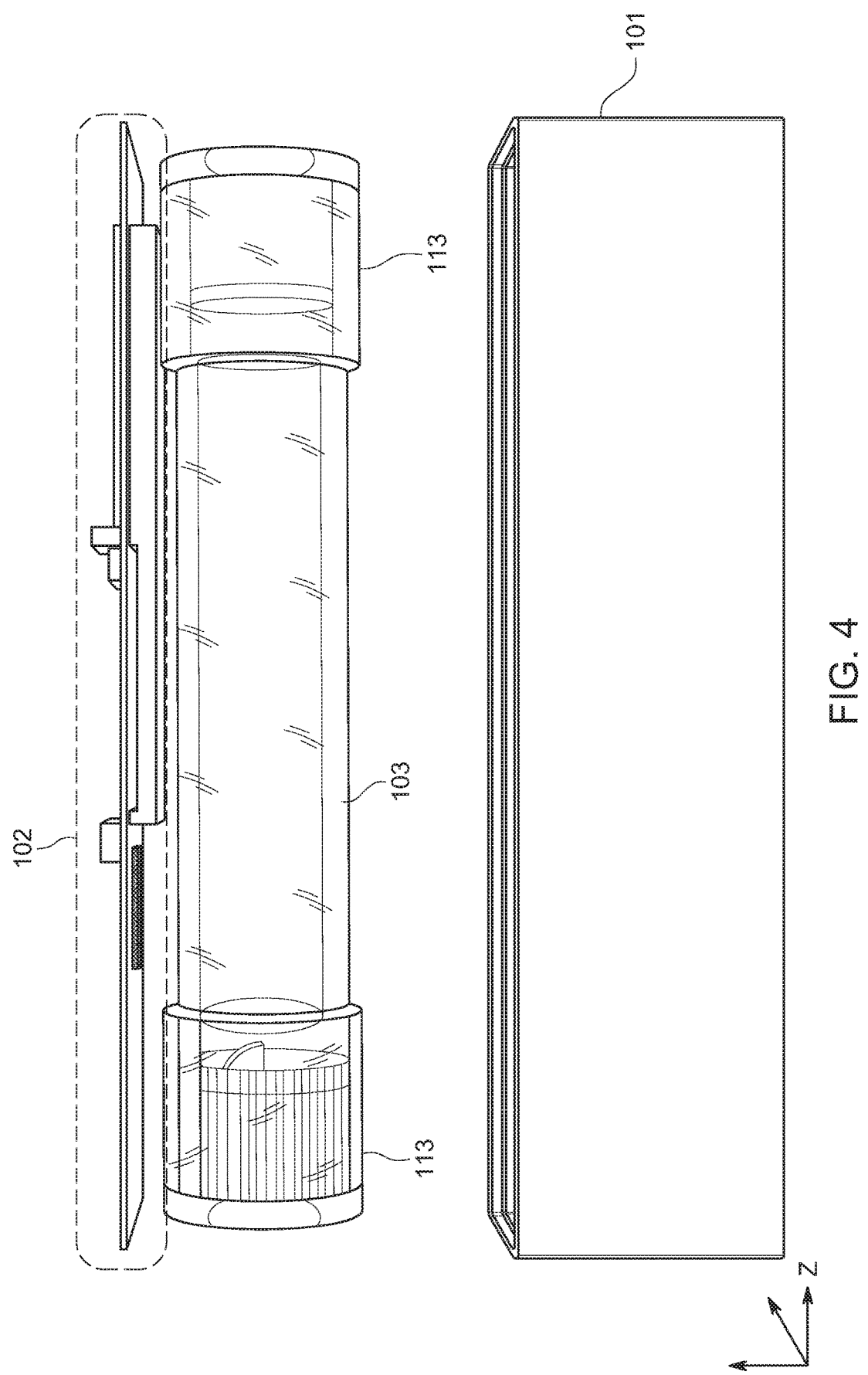
FIG. 4 is an exploded, side view of a cartridge according to one embodiment described herein.

In some embodiments, a cartridge 100 described herein further comprises a first end cap 113 and a second end cap 113. The first and second end caps 113, in some cases, are positioned at, or proximate to, the first and second end of the tube 103, respectively. For example, as shown in FIG. 4, a first end cap 113 can be positioned at the first end of the tube 103 and a second end cap 113 can be positioned at the second end of the tube 103. In some instances, the first end cap seals the first end of the tube and the second end cap seals the second end of the tube. The first and second caps 113 can fit over the first and second ends of the tube 103 to form their respective seals. Alternatively, the first and second caps 113 can function as plugs that are insertable into the respective ends of the tube 103.

In some embodiments, a cartridge described herein further comprises a first optical window 109 and second optical window 109. The first and second optical windows 109, in some cases, are positioned at, or proximate to, the first and second ends of the tube 103, respectively. For example, the first optical window 109 can be positioned at the first end of the tube 103 and the second optical window 109 can be positioned at the second end of the tube 103. In some cases, the first optical window provides an entrance for light into the cartridge 100 and the second optical window 109 provides an exit for light out of the cartridge, or the roles of the first and second optical windows 109 can be reversed. In some instances, the first and second optical windows 109 can traverse the end caps 113 and the housing 101. That is, in some embodiments, the first and second optical windows 109 can be formed from one or more openings or substantially transparent components of the cartridge 100. For example, a light can enter the cartridge via a first optical window 109 extending through the housing 101 and a first end cap 113, such that the light enters into the tube 103. The light can then traverse, travel, or be transmitted along the length of the tube 103 along a z-axis and exit the cartridge 100 via a second optical window 109 extending through a second end cap 113 and the housing 101.

In some embodiments, a cartridge 100 described herein can comprise a sample collection region 114. In some cases, the sample collection region 114 can comprise or be partially defined by one or more other components of the cartridge 100, such as a housing 101, a moveable door 104, a perforated tray 107, and/or an absorbent pad 112. The sample mixing region 114, in some instances can be in fluid communication with an exterior of the cartridge 100 when the door 104 of the cartridge is in an open position. Additionally, the sample collection region 114, in some instances, cannot be accessed by a user when the door 104 of the cartridge is in a closed position. In some embodiments, the absorbent pad 112 can comprise one or more volume markers 111 visible to a user before and/or after disposing a sample 105 onto the absorbent pad 112. For example, in some cases, the absorbent pad 112 can display one or more markings indicative of equal volumes or incremental volumes that inform a user the amount of sample 105 disposed on the pad 112. In some embodiments, the absorbent pad 112 is disposed on the perforated tray 107 such that a reaction product from a chemical reaction between a sample 105 and activation contents can freely move, dissipate, disperse, or diffuse through the perforated tray 107.

In some embodiments, one or more components of a cartridge 100 described herein can be operationally configured. For example, in some embodiments, the sample collection region 114 is operable to receive a sample 105 and the sample mixing compartment 102 is operable to mix contents of the activation pouch 106 with the sample 105 disposed in the sample collection region 114.

In some instances, the moveable door 104 can be configured to release contents of the activation pouch when the door is moved from the open position to the closed position. For example, the puncturing tool 108 positioned on the moveable door 104 or on the housing 101 can puncture, pierce, open, or rupture the activation pouch 106 during or upon closing the door 104. In some cases, such a configuration can result in mixing of the activation contents with the sample 105, which in some cases, elicits a chemical reaction between the sample 105 and the activation contents.

In some embodiments, the locking mechanism 110, can be configured to lock the moveable door 104 in a closed position. In some instances, the locking mechanism 110 can be permanent or irreversible, i.e. the moveable door 104 cannot be unlocked without destroying or defacing the cartridge 100 and/or the moveable door 104. In some instances, the locking mechanism 110 can be reversible. The locking mechanism 110, in some instances can provide a visual and/or audible feedback to a user confirming that the locking mechanism engaged.

In some embodiments, the moveable door 104, when engaged with the locking mechanism 110, is configured to provide an air-tight seal to the housing 101. In some cases, locking the moveable door 104 can occur by way of closing the door 104 to provide the air-tight seal to the housing 101, such as by displacing door 104 from a first end of cartridge 100 towards a central portion of cartridge 100 along the z-axis, as shown for example in FIG. 6. A first member of the locking mechanism 110 can be positioned on or attached to the moveable door 104 and a second member of the locking mechanism can be positioned on or attached to the housing 101, such that upon closing the door 104, the first member engages the second member to lock the door in a closed position. In other cases, locking the movable door 104 can occur by way of a locking mechanism 110 having a mechanical component, such as a mechanical switch, a mechanical lever, or a stretchable band that is engaged by the user after closing the door 104.

Figure 5:
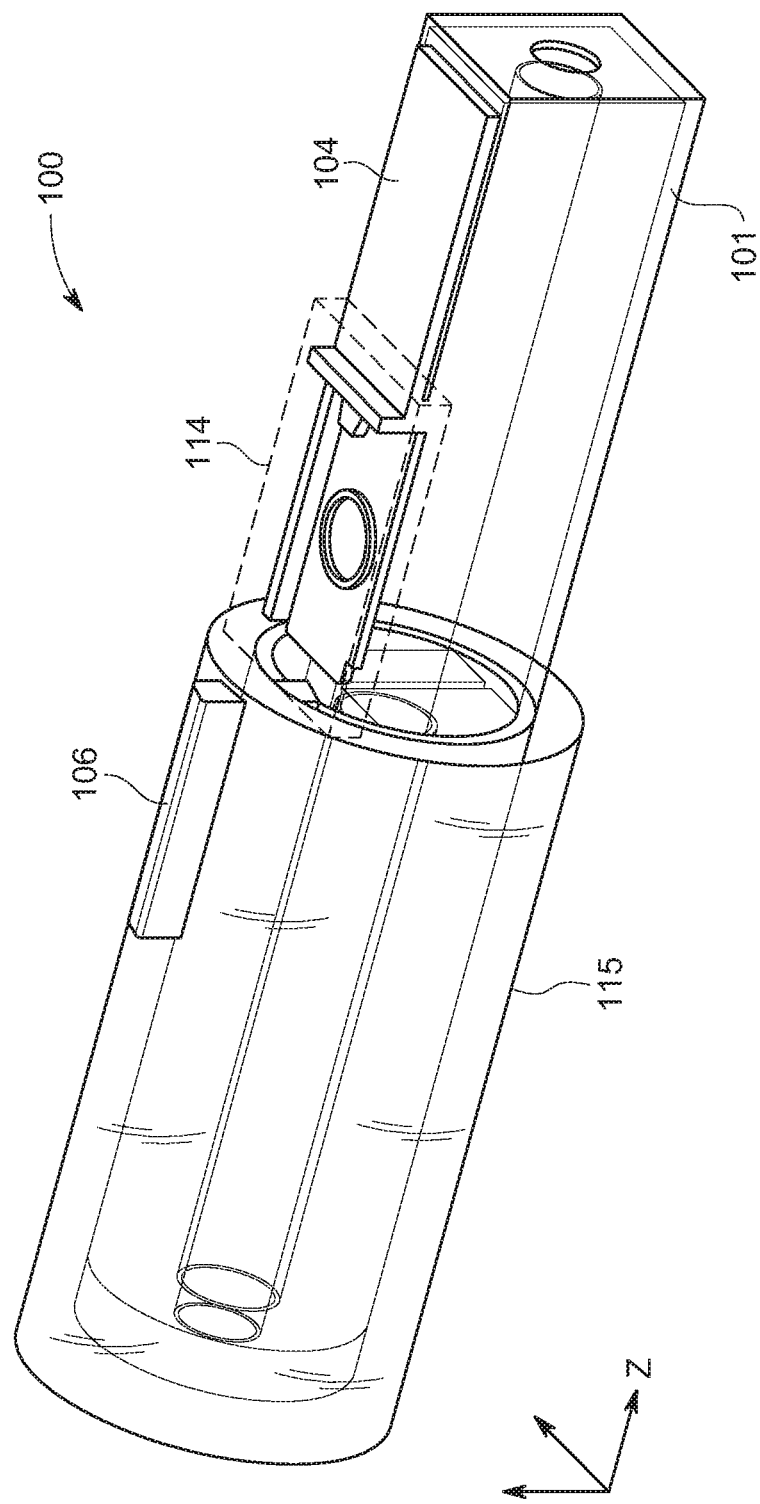
FIG. 5 is a perspective view of a cartridge according to one embodiment described herein.

In some embodiments, a cartridge 100 described herein can further comprise an outer tube 115, as illustrated in FIG. 5. In some cases, the outer tube 115 can be a component of housing 101, i.e. the housing 101 can comprise an outer tube 115. In some instances, the housing 101 can comprise or be partially defined by an outer tube 115. For example, in some instances, the outer tube 115 can mechanically connect or interlock with the housing 101, such as by a twisting mechanism or other interlocking mechanism, such as via a latch. In some instances, the sample mixing compartment 102 can be partially defined by the outer tube 115, and the activation pouch 106 can be positioned within the sample mixing compartment 102 and the outer tube 115. For example, in some instances, displacement of the outer tube 115 from the housing 101 can allow user access to the sample mixing compartment 102 and the activation pouch 106, allowing a user to replace one or more components of the cartridge 100, such as the activation pouch 106, the outer tube 115, the gas transporter tube 103, the puncturing tool, and/or the absorbent pad 112.

In some embodiments, the outer tube 115 can provide a gas impermeable seal of the housing 101. For example, the outer tube 115, in some embodiments, is gas impermeable. When such an outer tube 115 is connected or interlocked with the housing 101 of a cartridge 100, a gas impermeable seal can be provided to the cartridge 100. It should be understood that such a gas impermeable seal provided by interlocking the outer tube 115 and the housing 101 can be reversed or lost upon unlocking the outer tube 115 and the housing 101.

In some embodiments, a cartridge 100 described herein can be disposable or reusable. A disposable or reusable cartridge can have any one or more features or characteristics described hereinabove. In some instances, wherein a cartridge 100 is reusable, any one or more components of the cartridge, as described hereinabove, can be accessed by a user and replaced with a new or unused component. For example, a reusable cartridge, in some cases, can include a replaceable housing 101, gas transporter tube 103, moveable door 104, activation pouch 106, perforated tray 107, puncturing tool 108, optical window 109, locking mechanism 110, absorbent pad 112, end cap 113, or outer tube 115. Furthermore, user access to the one or more components in need of replacement can be accessed without damage to the housing 101 or without surrendering or compromising the ability of the cartridge to form a gas impermeable seal to prevent any gas leaks from any seams of the housing and/or the compartment when the moveable door 104 is in a closed position.

II. Devices for Detecting an Analyte

Figure 6:
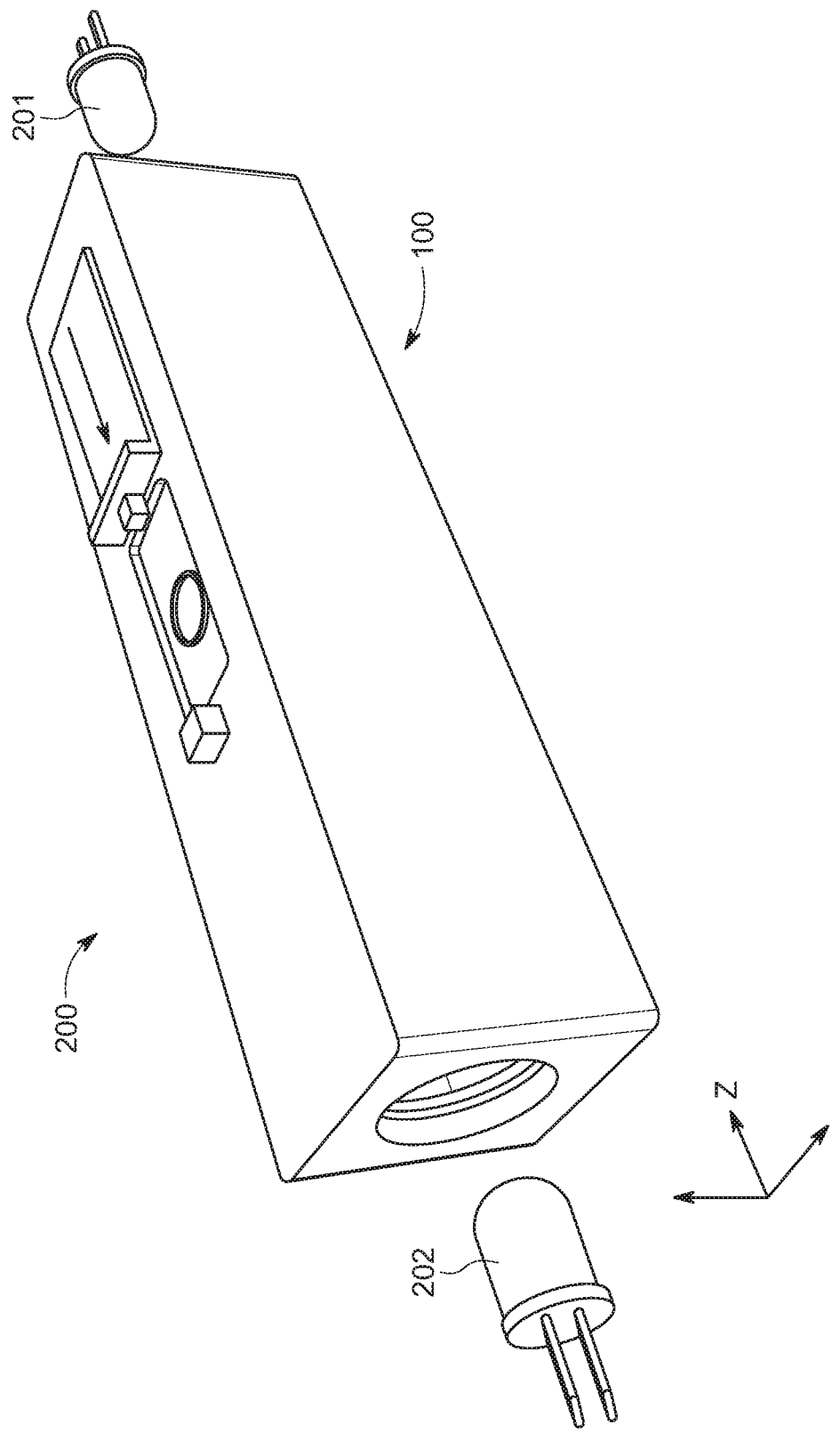
FIG. 6 is a perspective view of a device according to one embodiment described herein.

In another aspect, a device 200 for detecting an analyte in a sample is described herein, which in some embodiments, comprises a cartridge 100 as described in Section I. Features and/or characteristics of the cartridge 100 in such a device 200 described herein can include any one or more features and/or characteristics of the cartridge 100 described in Section I above. In some embodiments, device 200 having a cartridge 100 can further comprise a light source 201 positioned at a first end of the cartridge and/or at a first end of the gas transporter tube 103 disposed in the cartridge 100, and an optical detector 202 positioned at a second end of the cartridge and/or a second end of the gas transporter tube disposed in the cartridge 100. For example, as shown in FIG. 6, cartridge 100 in device 200 can be longitudinally positioned between a light source 201 and an optical detector 202, such that the light source 201 can project light through the length of the cartridge 100 along a z-axis and the optical detector 202 can detect light from the light source 201.

In some embodiments, the light source 201 of a device described herein can be any light source that emits light between about 250 nm and 1000 nm. In some cases, the light source can emit light between about 400 nm and 700 nm or between about 550 nm and 600 nm. The light source 201 can be a light source not inconsistent with the objectives of this disclosure, such as an LED light source.

The light source 201 of the device 200 can be positioned adjacent, proximate, or near a first end of the cartridge 100 such that the light source 201 is directed through a first optical window 109 of the cartridge 100 and into a first end of the gas transporter tube 103 disposed within the cartridge 100. Accordingly, in some instances, the light source 201 is directed longitudinally through the cartridge 100 along a z-axis, and preferably, through the gas transporter tube 103.

In some embodiments, the optical detector 202 of a device described herein can be any optical detector that can detect or receive light emitted from the light source 201. The optical detector 202 of the device 200 can be positioned adjacent, proximate, or near a second end of the cartridge 100 that is opposite the first end of the cartridge 100. The optical detector 202 can receive or detect light that is exiting the gas transporter tube 103 through a second optical window 109 of the cartridge 100 positioned opposite the first optical window 109. Accordingly, the optical detector 202 is positioned to detect light longitudinally directed through the cartridge along a z-axis, and preferably, through the gas transporter tube 103.

Figure 7:
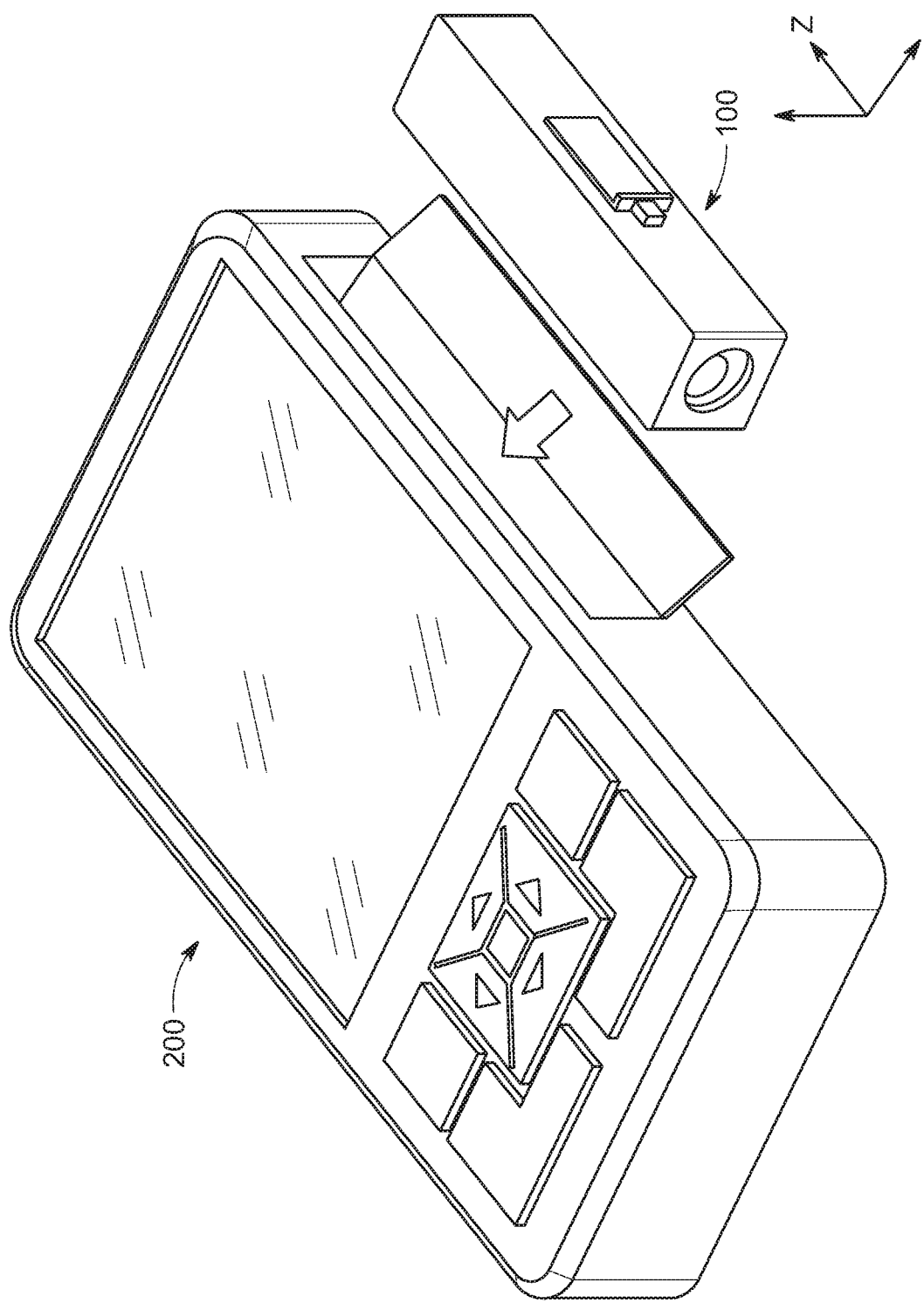
FIG. 7 is a perspective view of a device according to one embodiment described herein.

In some embodiments, a device 200 described herein further comprises a processor and a power source. For example, as shown in FIG. 7, device 200 can be a handheld unit operable to receive cartridge 100. Such a handheld unit can comprise, within its housing, light source 201 and optical detector 202. The light source 201 and the optical detector 202 can be positioned within the device 200 such that a cartridge 100 disposed within the device 200 is aligned along a z-axis with the light source 201 and the optical detector 202.

A device described herein can be configured to detect an analyte. For example, in some instances, the device is configured to detect cyanide. In some embodiments, a device for detecting cyanide in a sample is described herein. It should be noted that a device configured to detect an analyte can comprise an activation pouch comprising contents specific to the analyte. For example, a device for detecting cyanide can comprise an activation pouch comprising one or more of sulfuric acid, citric acid, sulfamic acid, and/or phosphoric acid. A device, in some cases, can detect an analyte, as described above in Section I.

In some embodiments, a device 200 described herein can detect an analyte in a liquid, semi-liquid, gel, or solid sample. In some embodiments, the device 200 can detect an analyte in a bodily fluid sample, an environmental sample, or a food sample. For example, in some cases, the device 200 can detect an analyte in a blood, water, or soil sample. As described above in Section I, the device 200 can be configured to detect various analytes using an activation pouch comprising appropriate activation contents for the analyte.

III. A Method of Detecting an Analyte

Figure 9:
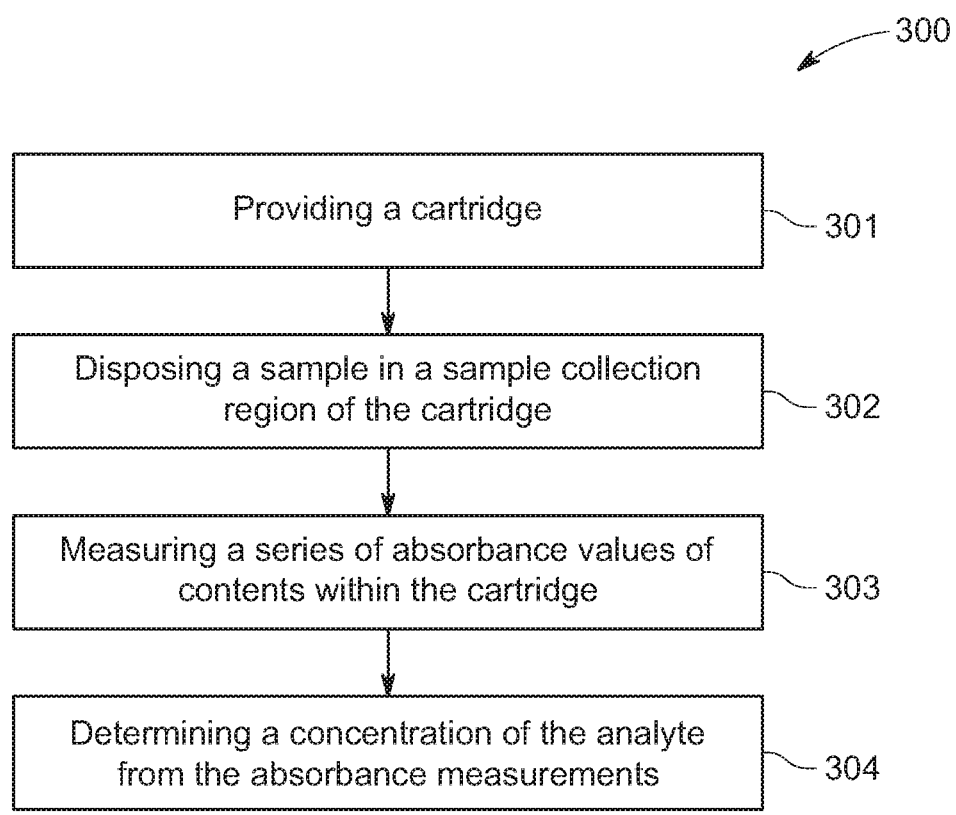
FIG. 9 is a block diagram of a method according to one embodiment described herein.

In another aspect, methods of detecting an analyte in a sample are described herein. As shown in FIG. 9, method 300 can comprise providing a cartridge at step 301. Any cartridge as described in Section I above can be used. In some embodiments, method 300 comprises disposing a sample in the cartridge at step 302; measuring a series of absorbance values of contents of the gas transporter tube at one or more wavelengths of light through the length of the gas transporter tube at step 303; and determining a concentration of the analyte from the absorbance measurements at step 304. In some embodiments, a method described herein comprises determining that the analyte is absent from the sample or present in the sample below a detectable level. Features and/or characteristics of a cartridge and/or a device used in methods described herein can include features and/or characteristics of any cartridge described in Section I and/or any device described in Section II herein.

In some embodiments, method 300 can further comprise one or more additional steps after disposing a sample in the cartridge at box 302 and prior to measuring a series of absorbance values at box 303, such as (i) closing the door of the cartridge, (ii) locking the door and/or sealing the housing of the cartridge, (iii) puncturing, piercing, or slicing open the activation pouch, (iv) releasing contents of the activation pouch onto the sample collection region, and/or (v) mixing contents of the activation pouch with the sample. In some cases, a step of (i) closing the door of the cartridge can occur substantially simultaneously as (ii) puncturing the activation pouch. Additionally, in some embodiments, a step of (ii) locking the door and sealing the housing of the cartridge can occur upon (i) closing the door of the cartridge. Furthermore, in some cases, (iii) puncturing the activation pouch can comprise a step of (iv) releasing contents of the activation pouch onto the sample collection region, wherein releasing the contents occurs upon puncturing the pouch.

In some embodiments, a step of mixing the contents of the activation pouch with the sample can optionally comprise gentle agitation or shaking of the cartridge and/or device to enhance and/or expedite the mixing.

In some embodiments, measuring a series of absorbance values in box 303 can comprise measuring absorbance values in time intervals. In some cases, the absorbance values can be measured in 5-30 second intervals. For example, in some instances, the absorbance values can be measured in substantially equal time intervals between 5 seconds and 30 seconds in length. In some instances, the absorbance values can be measured in unequal time intervals between 5 seconds and 30 seconds in length. Additionally, the series of absorbance values, in some cases, can be measured for 100 seconds to 300 seconds. For example, a series of absorbance values measured every 10 seconds for 120 seconds would include 12-13 measurements, depending on whether or not a zero or tare measurement is necessary at time 0.

In some embodiments, determining a concentration at block 304 can comprise calculating a slope of the absorbance measurements, and in some cases, comparing the slope to a predefined concentration table. The predefined concentration table can include data of known concentrations of the analyte, the data comprising absorbance values of the known concentrations of the analyte for the appropriate indicator species. The data of the predefined concentration table can vary for each analyte, activation pouch, and/or indicator species.

It is to be understood that a method described herein can include any combination of steps described herein and use any combination of equipment and materials described herein not inconsistent with the objectives of the present disclosure.

Some embodiments described herein are further illustrated in the following non-limiting examples.

Example 1

Rapid Sensitive Field-Deployable Blood Cyanide Monitor

Cyanide is a fast-acting chemical poison generated in residential and industrial fires that is a major cause of injury and death from smoke inhalation. Accurate and rapid assessment of burn victims to determine if they need treatment for cyanide poisoning is important, because empiric treatment of cyanide poisoning is expensive and carries significant health risks to the victim. As described herein, a novel field-deployable device is disclosed that can quickly and easily measure blood cyanide concentrations, and, in some cases, guide treatment of smoke inhalation victims.

The present disclosure enables a field-usable blood cyanide monitor that can measure a blood cyanide concentration of imminent concern (>10 µM) in 20 µl of blood at 90% confidence within two minutes and 95% confidence within three minutes. It consists of a small, handheld, reusable battery-operated reader, and a disposable cartridge. In this EXAMPLE, the cartridge contains a porous hydrophobic membrane tube filled with a dilute solution of aquocyanocobinamide, and serves the triple function of a gas transfer device, a reactor, and a long-path low-loss absorbance measurement cell. The cartridge is inserted into a reader immediately before use, such as is illustrated in FIG. 7. A sample from a micro-capillary pipette or syringe is introduced through a septum into the annular space outside the central tube. Actuation of a push-down lever simultaneously punctures a pouch containing a small amount of phosphoric acid, starts a clock in the reader, and activates the light detection and data acquisition electronics. The reader containing the cartridge is inverted twice to allow the blood sample to mix with the acid. The acid converts free and bound cyanide in the sample to HCN, which passes through the porous membrane to react with the aquocyanocobinamide to rapidly produce dicyanocobinamide. The amount of dicyanocobinamide formed is measured by absorption at 580 nm using a referenced light emitting diode (LED) source and a photodiode. An on-board Programmable System on a Chip calculates a slope of the increase in absorbance from a control, and, based on a pre-stored table, outputs the best-fit cyanide concentration every 10 sec from 60 to 120 and 180 sec.

Example 2

A Disposable Cartridge for a Rapid Sensitive Field-Deployable Blood Cyanide Monitor FIG. 1 shows a disposable cartridge to be used for cyanide detection. The cartridge contains a perforated tray with an absorbent filter paper strip. This is placed below a closable opening, which comes covered with a peel-off tape. Blood is applied to the paper strip. When the door is moved to a closed position, a knife edge cuts a pouch holding phosphoric acid that drops onto the paper and contacts the applied blood to form HCN from any cyanide present in the blood. The released HCN diffuses through the perforations in the porous hydrophobic membrane tube (PHMT), and reacts with aquocyanocobinamide in the PHMT. The resulting change in color of the cobinamide solution is monitored continuously through the long axis of the tube providing high sensitivity.

The core of the disposable cartridge is a gas transporter tube that holds a diluted solution of cobinamide. The tube is sealed at both ends using two clear plastic caps. These caps can be manufactured inexpensively using injection molding. These clear caps also act as optical windows to send light, from an LED, into the tube at one end and collect the light at the other end, to an optical detector, after absorption by the solution. The tube unit goes into a plastic case and locks onto a set of notches built into the inside of the case that aligns the clear plastic caps to openings on opposite ends of the case. A plastic lid is attached to the case to completely enclose the tube unit inside. The plastic lid features a sliding mechanism that, in the same action, closes a blood sample collection door and also cuts open an acid pouch glued to the bottom of the lid. When the blood sample is deposited on an absorbent pad and the slide door is closed. The acid from the pouch is released onto the absorbent pad, effecting the matrix isolation in the sample and liberating HCN gas. The HCN gas then permeates through the gas transporter tube and reacts with the cobinamide solution inside to tube, changing its absorption property. This change is detected by a set of LED and detector located inside the electronic reader, at the opposite ends of the cartridge to provide a quantitative representation of the cyanide content in the sample. The slide door once closed, locks into place and cannot be opened back, thus sealing everything inside the case. The case, lid, and slide door can be inexpensive manufactured using injection molding process. As much of the component manufacturing processes utilizes bulk manufacturing technologies, and also the device integration can be automated or mechanized, the disposable cartridge production is easily scalable to high quantities, enabling the product to be produced at a low cost.

Example 3

A Reusable Cartridge for a Rapid Sensitive Field-Deployable Blood Cyanide Monitor For iterative analysis using a rapid sensitive field-deployable blood cyanide monitor the device, a special type of reusable cartridge is also disclosed, which is similar to the disposable cartridge of Example 2. This reusable cartridge can provide a cost-effective way to conduct exhaustive parametric analysis of the device. The reusable cartridge shown in FIG. 5 is operationally nearly identical to the ultimate disposable cartridge shown in FIG. 1, except for a coaxial dual tube arrangement on one half of the cartridge that can be selectively opened and closed; this allows a user to replace the acid pouch by rotating the outer tube 115 over the inner tube, which also seals the internal chamber when closed. The absorbent pad in the sample collection region 114 on the tray can be easily replaced for repetitive experiments. With these modifications, this cartridge can be reused for multiple experiments with different combinations of activation pouch chemicals and samples for detecting various analytes.

Example 4

Assembly of a Rapid Sensitive Field-Deployable Blood Cyanide Monitor

The present example illustrates the construction and assembly process of a cartridge and its assembly with an electronic reader, particularly with reference to FIGS. 2-4 and FIGS. 6-8.

Figure 2:
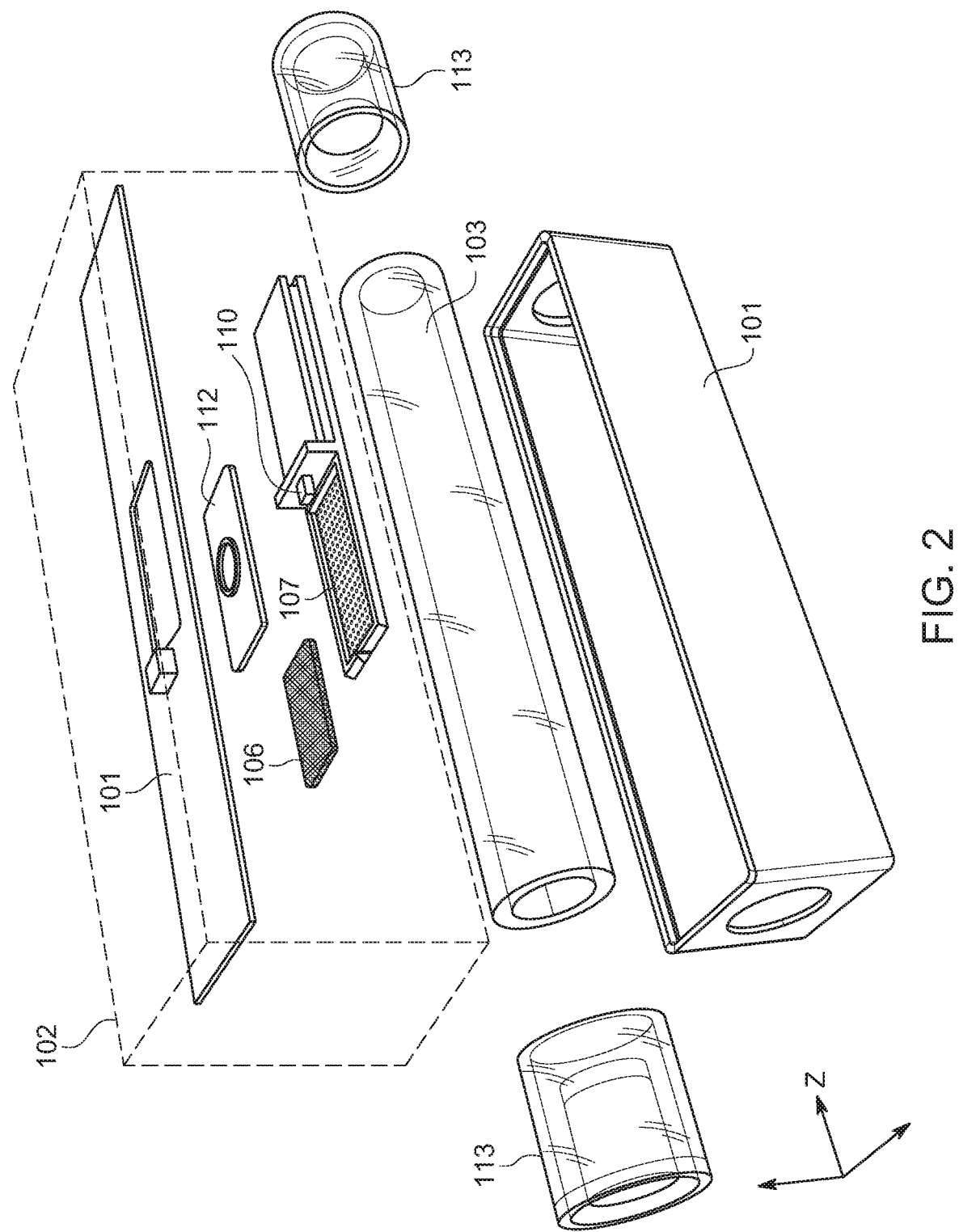
FIG. 2 is an exploded, perspective view of a cartridge according to one embodiment described herein.

FIG. 1 and FIG. 2 illustrate 3D renderings of a disposable cartridge & its construction steps:

1. Clear plastic cap are provided as end caps 113—these two molded caps made out of clear plastic seals the gas transporter tube at both ends and also provides an optical window to let light pass through.

2. A gas transporter tube 103 is provided that fits within the housing 101—this special tube, containing the cobinamide solution, allows gas to pass into the tube while blocking any liquid from getting into the tube.

3. An acid pouch is provided as an activation pouch 106—this small sachet contains the acid needed to liberate cyanide from blood.

4. An absorbent pad 112 with a volume marker 111 is provided—this pad collects the blood sample.

5. A slide door 104 with a cutter as a puncturing tool 108 is provided—the slide door is a molded part that performs dual action, i.e. when the door is closed, a small blade or cutter at the bottom of the part cuts open the acid pouch to mix the acid with the blood sample on the absorbent pad placed on the perforated tray 107, and seals the housing 101.

6. An enclosure lid and a cartridge enclosure are provided as housing 101 components—the enclosure lid is a molded plastic part that seals the interior of the cartridge and includes a notch that secures the sliding door in place once closed, preventing it from opening back. The cartridge enclosure is a molded plastic part that acts as the outer case that further surrounds or encloses the cartridge interior or contents.

Figure 3:
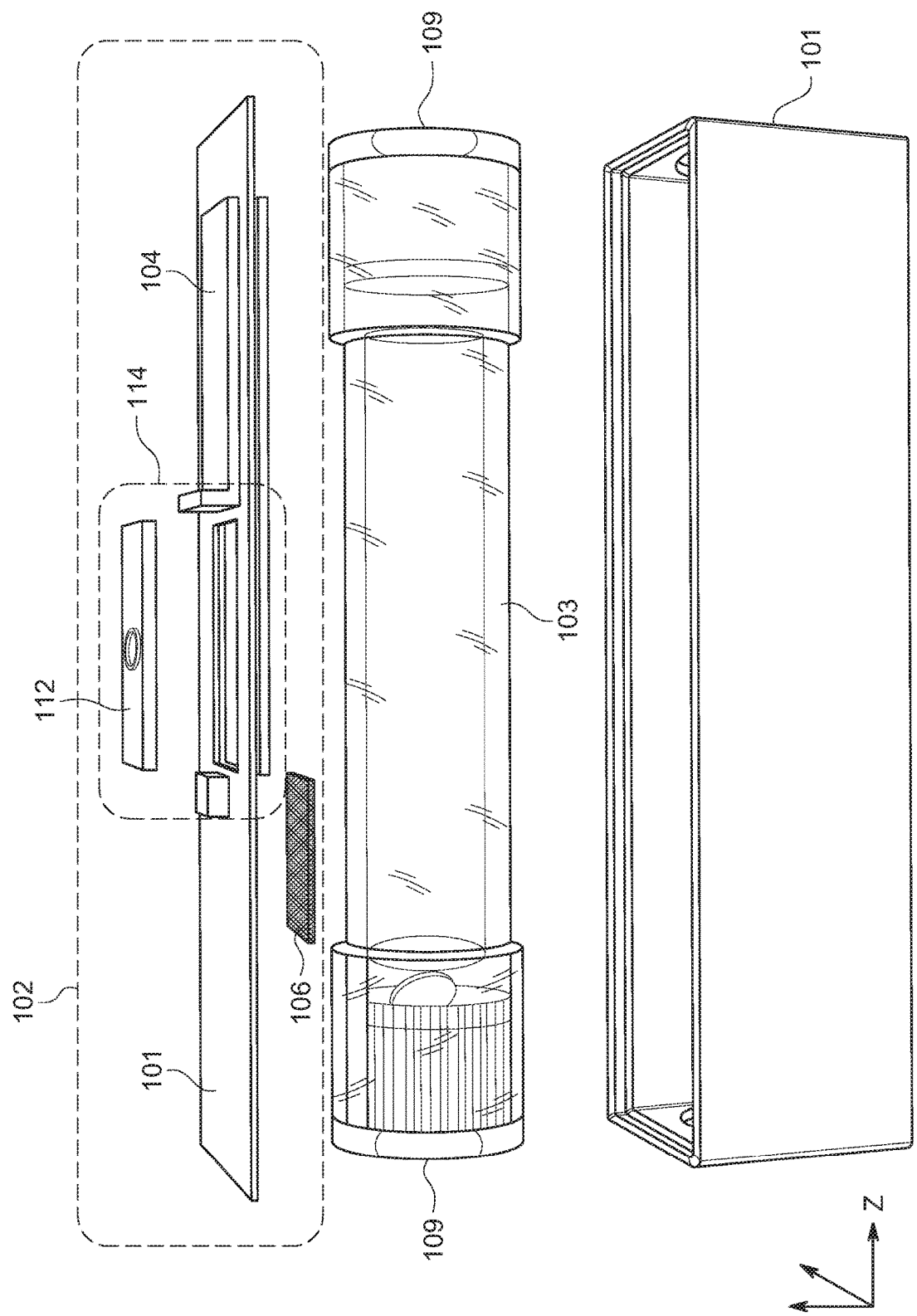
FIG. 3 is an exploded, side view of a cartridge according to one embodiment described herein.

FIG. 3 illustrates an intermediate manufacturing step for gas transporter tube 103 assembly in the housing 101.

FIG. 4 illustrates an intermediate manufacturing step for assembly of the housing 101, including an enclosure lid and a cartridge enclosure.

The fully assembled cartridge can then be fitted, arranged, or aligned with an LED and optical detector as illustrated in FIG. 6.

One example of such a configuration in FIG. 6 includes loaded or inserted the fully assembled cartridge, having a sample disposed in the sample collection region, into an electronic reader, as illustrated in FIG. 7.

Figure 8:
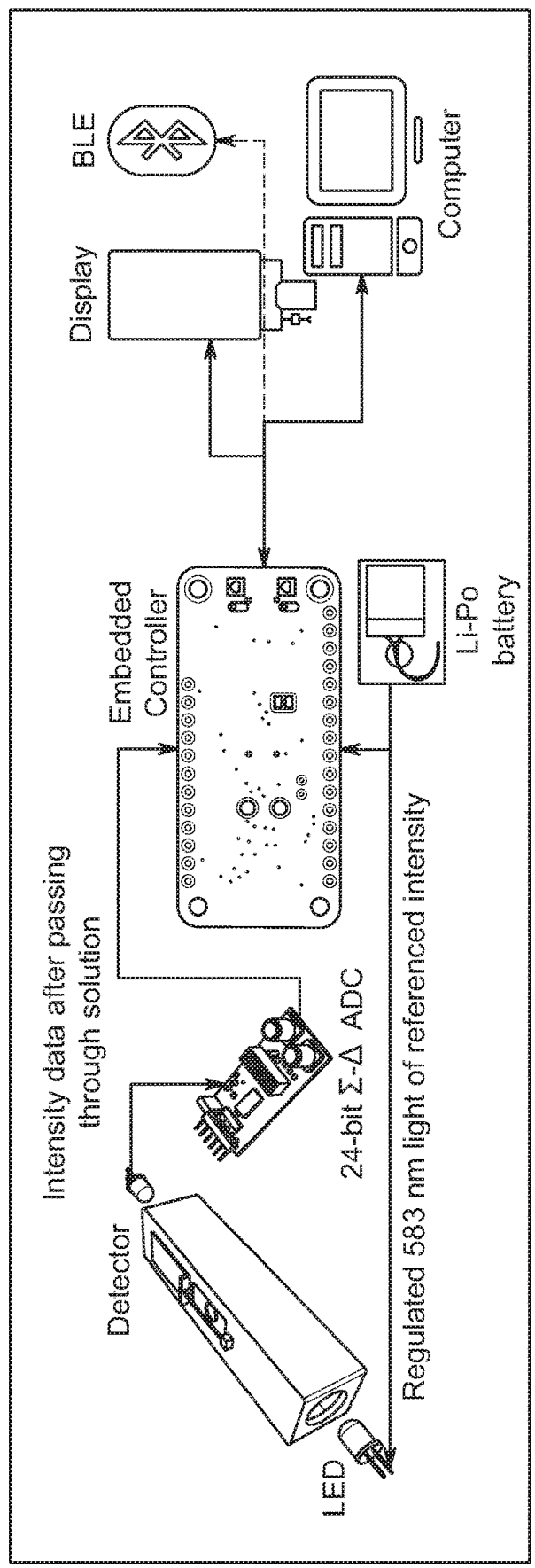
FIG. 8 is a schematic illustration of various modules of an electronic reader and system according to one embodiment described herein.

FIG. 8 illustrates various modules of the electronic reader. The electronic reader can feature an on-board embedded processor to compute the level of cyanide from the detector readings based on a calibration curve. On-board power can be made available from a rechargeable battery backpack. For easy usability, the measurement device can have a display screen along with buttons for major functionalities such as triggering the measurement, calibrating, and navigating through different menu and display options. Wired and wireless connectivity between the instrument and external computer can be provided to update the firmware, transfer data, and participate in connected health networks. The readings can be logged with timestamps for historical trend observations. The on-board embedded controller calculates the slope of the temporally increasing absorbance from 30 seconds (s), and based on a pre-stored look-up table, outputs the best-fit cyanide level from 60 s onward, updating every 10 s, reaching 90% and 95% confidence levels, respectively, by about 120 s and 180 s.

Various embodiments of the present invention have been described in fulfillment of the various objectives of the invention. It should be recognized that these embodiments are merely illustrative of the principles of the present invention. Numerous modifications and adaptations thereof will be readily apparent to those skilled in the art without departing from the spirit and scope of the invention.

The invention claimed is:

1. A cartridge comprising:
   a housing;
   a sample mixing compartment disposed within the housing, the sample mixing compartment comprising:
      an activation pouch, and
      a sample collection region; and
   a gas transporter tube having a first end and a second end, the tube being disposed within the housing adjacent to the sample mixing compartment,
   wherein the sample mixing compartment is partially defined by a moveable door of the housing, the moveable door providing access to the sample mixing compartment when the door is in an open position and preventing access to the sample mixing compartment when the door is in a closed position; and
   wherein the door is configured to release contents of the activation pouch upon movement from the open position to the closed position.

2. The cartridge of claim 1, further comprising:
   a first optical window positioned proximate the first end of the tube; and
   a second optical window positioned proximate the second end of the tube.

3. The cartridge of claim 1, further comprising:
   a first end cap positioned at the first end of the tube; and
   a second end cap positioned at the second end of the tube.

4. The cartridge of claim 1, further comprising:
   a puncturing tool positioned on the door or the housing configured to puncture the activation pouch upon movement of the door from the open position to the closed position.

5. The cartridge of claim 1, wherein the housing is gas impermeable and the gas transporter tube is liquid impermeable.

6. The cartridge of claim 1, wherein the gas transporter tube is formed from a hydrophobic material or comprises a hydrophobic coating.

7. The cartridge of claim 6, wherein the hydrophobic material is a microporous thermoplastic polymer.

8. The cartridge of claim 1, wherein a liquid is disposed within the gas transporter tube, the liquid having a first absorbance at a wavelength λ in an absence of an analyte and a second absorbance at the wavelength λ in a presence of the analyte.

9. The cartridge of claim 8, wherein the first absorbance corresponds to an indicator species in an unbound or unreacted state and the second absorbance corresponds to the indicator species in a bound or reacted state.

10. The cartridge of claim 9, wherein the indicator species in the bound or reacted state is bound to or reacted with the analyte.

11. The cartridge of claim 10, wherein the analyte comprises a cyanide.

12. The cartridge of claim 9, wherein the indicator species comprises a cobinamide.

13. The cartridge of claim 1, wherein the moveable door provides an air-tight seal to the housing in the closed position, and provides access to the sample collection region in the open position.

14. The cartridge of claim 1, wherein the sample collection region comprises an absorbent pad disposed on a perforated tray.

15. The cartridge of claim 1, wherein the activation pouch comprises an acidic solution or a basic solution.

16. The cartridge of claim 15, wherein the activation pouch comprises $H_3PO_4$.

17. The cartridge of claim 1, wherein the activation pouch is positioned within the sample mixing compartment.

18. A device for detecting an analyte in a sample, the device comprising:
   the cartridge of claim 1;
   a light source positioned at the first end of the tube; and
   an optical detector positioned at the second end of the tube.

19. The device of claim 18, wherein the light source emits light at a wavelength between 250 nm and 1000 nm.

20. A method of detecting an analyte in a sample, the method comprising:
   providing a cartridge according to claim 1,
   disposing the sample in the sample collection region;
   releasing contents of the activation pouch by moving the door from the open position to the closed position;
   measuring a series of absorbance values of contents of the tube at one or more wavelengths of light through the length of the tube, and
   determining a concentration of the analyte from the absorbance measurements.

21. The cartridge of claim 1, further comprising:
   a locking mechanism attached to, positioned on, or incorporated into the moveable door.

22. The device of claim 18, wherein the device is handheld.

23. The device of claim 18, wherein the light source emits light at a wavelength between 400 nm and 700 nm.

24. The device of claim 23, wherein the light source is an LED light source.

25. The device of claim 18, further comprising:
   a processor; and
   a power source.

26. The device of claim 25, wherein the power source is a battery.

27. The device of claim 25, wherein the analyte is a cyanide and the processor is configured to compute a level of the cyanide based on a calibration curve.

28. The device of claim 18, further comprising:
   a display screen; and
   buttons.

29. The method of claim 20, wherein determining the concentration of the analyte comprises calculating a slope of the series of absorbance values and comparing the slope to a predefined concentration table.

30. The method of claim 29, further comprising:
   outputting the concentration of the analyte.

31. The method of claim 20, further comprising:
   locking the door in the closed position.

32. The method of claim 20, further comprising:
   agitating the cartridge to mix the contents of the activation pouch with the sample.

* * * * *